United States Patent [19]
Park

[11] Patent Number: 5,405,883
[45] Date of Patent: Apr. 11, 1995

[54] ETHYLENE POLYMER FOAMS BLOWN WITH ISOBUTANE AND 1,1-DIFLUOROETHANE AND A PROCESS FOR MAKING

[75] Inventor: Chung P. Park, Pickerington, Ohio

[73] Assignee: The Dow Chemical Company, Midland, Mich.

[21] Appl. No.: 284,724

[22] Filed: Aug. 2, 1994

Related U.S. Application Data

[63] Continuation-in-part of Ser. No. 252,149, Jun. 1, 1994, abandoned, which is a continuation of Ser. No. 90,833, Jul. 12, 1993, abandoned.

[51] Int. Cl.⁶ .................................................. C08J 9/14
[52] U.S. Cl. ........................................ 521/98; 264/53; 264/DIG. 5; 521/79; 521/142; 521/143; 521/149; 521/910
[58] Field of Search ............ 264/53, DIG. 5; 521/79, 521/98, 142, 143, 149, 910

[56] References Cited

U.S. PATENT DOCUMENTS

| | | | |
|---|---|---|---|
| 4,370,378 | 1/1983 | Zabrocki | 428/339 |
| 4,528,300 | 7/1985 | Park | 521/79 |
| 4,640,933 | 2/1987 | Park | 521/94 |
| 5,110,838 | 5/1992 | Tokiwa et al. | 521/79 |
| 5,147,896 | 9/1992 | York | 521/79 |
| 5,288,763 | 2/1994 | Park et al. | 521/79 |

FOREIGN PATENT DOCUMENTS

| | | | |
|---|---|---|---|
| 8372618331 | 12/1981 | Japan . | |
| 60-32289449 | 4/1985 | Japan | B29C 47/54 |
| 9103366305 | 5/1989 | Japan . | |
| 2-08370211 | 5/1990 | Japan | C08J 23/04 |

*Primary Examiner*—Morton Foelak
*Attorney, Agent, or Firm*—J. Robert Dean, Jr.

[57] ABSTRACT

Disclosed is an ethylene polymer foam structure having enhanced processing and physical properties. The foam structure comprises an ethylenic polymer material and a blowing agent of isobutane and 1,1-difluoroethane. Further disclosed is a process for making the foam structure.

12 Claims, 1 Drawing Sheet

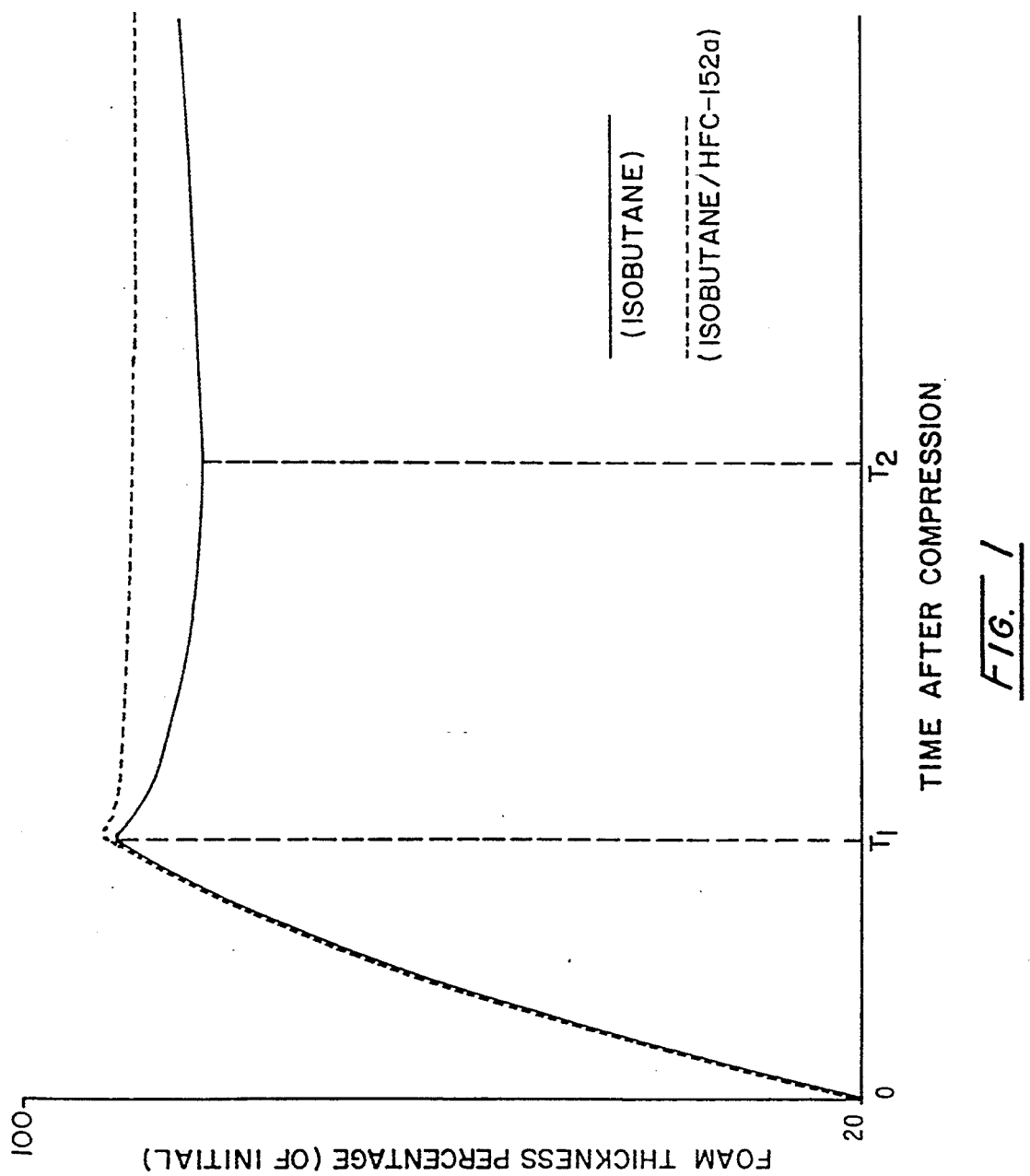

ETHYLENE POLYMER FOAMS BLOWN WITH ISOBUTANE AND 1,1-DIFLUOROETHANE AND A PROCESS FOR MAKING

This application is a continuation-in-part of application Ser. No. 08/252,149, filed Jun. 1, 1994, now abandoned, which is a continuation of application Ser. No. 08/090,833, filed Jul. 12, 1993, now abandoned.

BACKGROUND OF THE INVENTION

This invention relates to an ethylene polymer foam structure having enhanced processability and physical properties. The invention further relates to a process for making the foam structure.

Isobutane has become a preferred blowing agent for making ethylene polymer foam structures because of its zero ozone depletion potential and relatively high degree of processability and foamability, which can result in end products having generally desirable physical properties. A concern with using isobutane is that it is a volatile organic compound, which may be subject to environmental regulation. Another concern is that under some conditions, sometimes incomplete or inconsistent compressive recovery can be encountered in end product foam structures at certain critical points in time in the product life cycle.

A means of reducing the volatile organic content of a blowing agent containing isobutane is to replace part of the isobutane with a hydrofluorocarbon, which may not cause the same measure of environmental concern. A suitable hydrofluorocarbon is 1,1-difluoroethane (HFC-152a).

Replacing isobutane with HFC-152a can present processing and extrusion problems because of the relatively low solubility of HFC-152a in melts of ethylene polymers. The processing and extrusion problems would be expected to take the form of a relatively narrow range or "window" of foaming temperatures or less than desirable physical properties in the end product. Undesirable physical properties can include poor skin quality, small cell size, high foam density, and small cross-section.

Foam structures blown with a blowing agent comprised entirely of isobutane sometimes do not fully recover after compression, which the foam structures are often subjected to during die cutting. After compression and release from compression, foam structures blown entirely with isobutane recover a substantial proportion (i.e. about 88-95 percent by volume or thickness) of their initial volume prior to compression, but may then shrink to some degree (i.e. about 3-10 percent by volume or thickness) for an extended period of time before expanding and re-gaining a substantial proportion of the initial volume. This temporary shrinkage is a problem for cushion packaging end users or customers because the shrinkage typically occurs while the foam structure is being used as cushion packaging. The shrinkage results in an undesirable loose fit between the packaging material and the article or articles being packaged.

It would be desirable to have an ethylene polymer foam structure and process for making wherein the use of isobutane as a blowing agent is reduced. It would further be desirable to make such a foam structure under a relatively wide range of processing conditions with desirable foam physical properties. It would further be desirable to make such a foam structure with improved compressive recovery.

SUMMARY OF THE INVENTION

According to the present invention, there is an ethylene polymer foam structure comprising an ethylenic polymer material and a blowing agent. The ethylenic polymer material comprises greater than 50 percent by weight ethylenic monomeric units. The blowing agent comprises isobutane and 1,1-difluoroethane (HFC-152a). A surprising and unexpected feature of this invention was that a blowing agent of isobutane and HFC-152a would acceptably or substantially maintain the processability of a blowing agent comprising solely or entirely isobutane. Further surprising and unexpected was that desirable physical properties were likewise maintained to an acceptable or substantial degree. Another surprising and unexpected feature was enhanced compressive recovery over a corresponding foam structure blown solely or entirely with isobutane.

Further according to the present invention, there is a process for making an ethylenic polymer foam structure. The process comprises: a) heating an ethylenic polymer material to form a melt polymer material; b) incorporating into the melt polymer material at an elevated pressure a blowing agent to form a foamable gel; and c) expanding the foamable gel at a lower pressure to form a foam structure. The ethylenic polymer material and the blowing agent are as described above.

BRIEF DESCRIPTION OF THE DRAWINGS

The novel features of the present invention and the context within which they are set will be better understood upon viewing the following specification together with the drawing.

FIG. 1 is a view of a representational comparative plot of the general compressive recovery behavior of ethylene polymer foam structures blown with blowing agents of isobutane and isobutane/HFC-152a.

DETAILED DESCRIPTION

The present foam structure comprises an ethylenic polymer material. Suitable ethylenic polymer materials include ethylenic homopolymers and copolymers of ethylenic compounds and copolymerizable ethylenically unsaturated comonomers. The ethylenic polymer material may further include minor proportions of non-ethylenic polymers. The ethylenic polymer material may be comprised solely of one or more ethylenic homopolymers, one or more ethylenic copolymers, a blend of one or more of each of ethylenic homopolymers and copolymers, or blends of any of the foregoing with a non-ethylenic polymer. Regardless of composition, the ethylenic polymer material comprises greater than 50 and preferably greater than 70 weight percent of ethylenic monomeric units. Most preferably, the ethylenic polymer material is comprised completely or entirely of ethylenic monomeric units. Most preferred ethylenic polymers are polyethylene homopolymers. Polyethylenes may be of the high, medium, low, linear low, or ultra-low density type. Most preferred are low density polyethylenes. The polyethylenes may be linear, branched, or lightly cross-linked.

Suitable ethylenic copolymers may be comprised of ethylenic monomeric units and minor amounts, preferably 20 percent or less by weight, of a monoethylenically unsaturated monomeric unit or units copolymerizable therewith. Suitable comonomers include $C_{1-4}$ alkyl acids and esters, ionomeric derivatives, $C_{2-6}$ dienes, and $C_{3-9}$ olefins. Examples of suitable comonomers include acrylic acid, itaconic acid, maleic acid, methacrylic acid, ethacrylic acid, methyl acrylate, methyl methacrylate, ethyl acrylate, vinyl acetate, carbon monoxide, maleic anhydride, acrylonitrile, propylene, isobutylene, and butadiene.

The present ethylene polymer foam is generally prepared by heating an ethylenic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum or evacuated), but is preferably at an atmospheric level.

The blowing agent comprises isobutane and HFC-152a. The blowing agent preferably comprises about 5 to about 95, more preferably about 15 to about 85, and most preferably about 25 to about 75 weight percent isobutane based upon the total weight of the blowing agent. The blowing agent further preferably comprises about 95 to about 5, more preferably about 85 to about 15, and most preferably about 75 to about 25 weight percent of HFC-152a. A most preferred blowing agent comprises entirely isobutane and HFC-152a.

It was surprising that HFC-152a could be used in a blowing agent with isobutane and maintain at least acceptable levels of certain desirable processing and physical properties in end product foam structures heretofore obtainable only with isobutane. Preferably, desirable processing and physical properties are substantially maintained with the use of a HFC-152a/isobutane blowing agent compared to a blowing agent comprised entirely of isobutane on an equimolar basis (the total number of moles of isobutane and HFC-152a in the blowing agent being equal to the number of moles of isobutane in a corresponding blowing agent comprising entirely isobutane). Which processing and physical properties are desirable will vary according to the characteristics of a desired end product foam structure, and the HFC-152a/isobutane blowing agent need not offer advantageous performance in every property. Processing properties important in most conventional applications include foaming temperature range or window and cross-sectional size. Physical properties important in most conventional applications include skin quality, cell size, density, open-cell content, dimensional stability, and compressive recovery.

It was further surprising the use of HFC-152a with isobutane in a blowing agent resulted in enhanced compressive recovery in end product foam structures compared to foam structures produced with a blowing agent comprised entirely of isobutane on an equimolar basis. Foam structures blown with isobutane and HFC-152a were found to exhibit typically greater compressive recovery and more consistent compressive recovery. Enhanced compressive recovery provides better cushioning performance. Specifically, the use of HFC-152a with isobutane provides a foam structure with more consistent dimensional stability after compression than with isobutane alone.

FIG. 1 is a representation of the general compressive recovery behavior sometimes exhibited by foam structures blown entirely with isobutane as well as the general compressive recovery behavior of foam structures of the present invention blown with isobutane and HFC-152a. FIG. 1 is representational, and does not necessarily correspond exactly to the examples below.

FIG. 1 illustrates compressive recovery behavior sometimes exhibited by foam structures blown entirely with isobutane. Dimensional stability is represented as a function of foam thickness as a percentage of the initial thickness versus time. After such foam structures are compressed to a substantial degree, such as about 80 percent of initial volume, the compression is released to allow re-expansion of the foam structure to a temporary volume ratio peak at time $T_1$. $T_1$ will vary according to foam structure composition and process conditions, but typically ranges from 1 hour to 3 days. After $T_1$ for reasons unknown, the foam structures expanded with isobutane may continue to shrink by about 3 to 10 percent in volume until a minimum is reached at $T_2$. $T_2$ will vary according to foam composition and thickness, but typically ranges from 2 weeks to 5 weeks. After $T_2$, foam thickness slowly recovers, but may take months to recover.

FIG. 1 further represents the general compressive recovery behavior of foam structures of the present invention blown with isobutane and HFC-152a. As shown in FIG. 1, recovery after release from compression generally follows that of corresponding structures blown solely with isobutane until about time $T_1$. Foam structures of the present invention typically exhibit about the same or greater peak recovery at $T_1$ than corresponding foam structures blown solely with isobutane. The present structure may not shrink at all or may shrink to a lesser degree, i.e. about 3 percent or less.

Blowing agents useful in small amounts (about 20 weight percent or less based upon the total weight of the blowing agent) as co-blowing agents with isobutane and HFC-152a include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, pentafluoroethane, difluoromethane, perfluoroethane, 2,2-difluoropropane, 1,1,1-trifluoropropane, 1,1,1-trifluoroethane (HFC-143a), 1,1,1,2-tetrafluoroethane (HFC-134a), perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

Excellent teachings regarding the use of blends of HFC-152a and isobutane as blowing agents are seen in U.S. Ser. No. 08/056,230 filed Apr. 30, 1993 and U.S. Ser. No. 08/056,231 filed Apr. 30, 1993, which are incorporated herein by reference.

The amount of blowing agent incorporated into the polymer melt material to make a foam-forming polymer gel is from about 0.2 to about 5.0, preferably from about 0.5 to about 3.0, and most preferably from about 1.0 to 2.50 gram-moles per kilogram of polymer (mpk).

The present foam structure may be crosslinked or non-crosslinked, but is preferably substantially non-crosslinked or substantially free of crosslinking. Substantially non-crosslinked is inclusive however, of the slight degree of crosslinking which may occur naturally without the use of crosslinking agents or radiation.

The present foam structure has a density of about 200 or less, more preferably about 100 or less, and most preferably about 10 to about 70 kilograms per cubic meter according to ASTM D-1622. The foam has an average cell size of about 0.1 to about 5.0 preferably about 0.5 to about 3.0, and most preferably from about 0.2 to about 1.8 millimeters according to ASTM D3576-77.

The foam component of the present foam structure may be closed cell or open cell. Preferably, the present foam is about 50 percent or less open-cell and most preferably about 20 percent or less according to ASTM D2856-A.

The present foam structure exhibits excellent dimensional stability. Preferred foams recover 80 or more percent of initial volume within a month with initial volume being measured within 30 seconds after extrusion. Stability control agents may be incorporated to enhance dimensional stability. Suitable agents include those known in the art, such as $C_{12-22}$ fatty acid amides, amines, and esters. Preferred agents include stearyl stearamide and glycerol monostearate.

Various additives may be incorporated in the present foam structure such as inorganic fillers, pigments, antioxidants, acid scavengers, ultraviolet absorbers, flame retardants, processing aids, extrusion aids, and the like.

A nucleating agent may be added to control cell size if desired. Preferred nucleating agents include inorganic substances such as calcium carbonate, talc, clay, titanium oxide, silica, barium sulfate, diatomaceous earths mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The present foam may take the form of sheet, rods, tubes planks, or coalesced-strand planks.

The following are examples of the present invention, and are not to be construed as limiting. Unless otherwise indicated, all percentages, parts, or proportions are by weight.

EXAMPLES

Ethylene polymer foam structures of the present invention are made according to the process of the present invention.

Example 1 and Control Example 1

An ethylene polymer foam structure of the present invention was prepared with a blowing agent of HFC-152a and isobutane. Control foam structures prepared with a blowing agent of either 1,1-difluoroethane (HFC-152a) or isobutane ($iC_4$) were also prepared. The present foam structure and the control structures were compared for processability and physical properties.

The apparatus used was a 25 mm (1 inch) screw type extruder having additional zones for mixing and cooling at the end of usual sequential zones for feeding, metering, and mixing. An injection port for the blowing agent was provided between the metering and mixing zones. A die having a rectangular orifice was attached at the end of the cooling zone. The height of the orifice, hereinafter called the die gaps was adjustable while its width was fixed at 3.68 mm (0,145 inch).

A granular low density polyethylene (LDPE) resin having a melt index (ASTM D-1238 190° C./2.16 kgs) of 1.8 dg/min (decigrams/minute) and a density of 0,923 g/cm$^3$ was pre-blended with a concentrate of glycerol monostearate (GMS) to yield an effective GMS level of 1.3 parts per hundred (pph) and a small amount (0.02 pph) of talcum powder to form a solid mixture. The solid mixture was fed to the extruder, and extruded at a uniform rate of 2.3 kilograms per hour (kgs/hr) (5 pounds per hour (lbs/hr)). The temperatures maintained at the extruder zones were 100° C. at the feeding zone, 160° C. at the melting zone, 180° C. at the metering zone, and 193° C. at the mixing zone. The blowing agent was uniformly injected at a rate so the blowing agent level was 1.3 gram-moles per kilogram of polymer (mpk). The temperature of the cooling zone was gradually reduced to cool the polymer/blowing agent mixture (foamable gel) to an optimum foaming temperature. The die and the cooling zone were maintained at the same temperature.

The present structure and the control structures were compared for foamability, an indicator of processability, by measuring the range or "window" of foaming temperature. The foaming window was determined as follows. Starting at the gel temperature where the foam rose and remained stabilized, a foam strand was saved at a critical die gap (a threshold die gap for pre-foaming). The gel temperature was then dropped one degree and another foam sample was taken. The operation was repeated until there was an indication the cooling section was "froze off". The freeze-off (same as froze off) condition was indicated by deterioration of foam quality accompanied by a sharp increase of gel pressure entering into the cooling zone. The foaming temperature window was defined as the range of foaming temperature providing an open cell content in the foam no greater than a specified value (10 percent open cell for the examples herein). The optimum foaming temperature wherein minimum foam density was achieved varied between 107° C.–109° C. for the three tests.

The foam structures were aged for at least two weeks, and analyzed for cross-sectional size (area), cell size, density and open cell content. Process and physical property data are set forth in Table 1.

The present foam structure blown with the HFC-152a/isobutane blowing agent (Test 1.1) was of good quality at a wide range of foaming temperatures. Its foaming temperature window (13° C.) was shown to be one degree wider than the control structure blown with isobutane alone (Test 1.2) and significantly greater than the control structure blown with HFC-152a alone (Test 1.3). The present foam structure was very comparable with the control structure blown with isobutane alone in foam cross-section, density, cell size, and skin quality, and clearly superior in those physical properties to those control structures blown with HFC-152a alone. It was very surprising the desirable processing and physical properties of the foam structure blown with isobutane alone could be substantially maintained in the foam structure blown with one-half by mole isobutane and one-half by mole HFC-152a in view of the much less desirable processing and physical properties of the foam structure blown with HFC-152a alone.

Example 2 and Control Example 2

An ethylene polymer foam structure of the present invention was prepared with a blowing agent of HFC-152a and isobutane. A control structure blown with HFC-152a alone was also prepared. The foam structures were compared for processability and physical properties.

The polymers used were a 74/26 by weight blend of a LDPE resin having 0.919 g/cm$^3$ density and 0.22 dg/min melt index and another LDPE having 0.919 g/cm$^3$ density and 7 dg/min melt index. The polyethylenes were pre-blended with a concentrate of stearyl stearamide to yield an effective stearamide level of 1.3 pph. No nucleating agent was employed. The blowing agent was employed at a level of 1.3 mpk.

The foam structure blown with a 75/25 by mole HFC-152a/isobutane was compared with a control foam structure blown entirely with HFC-152a. Properties were determined substantially as in Example 1. Process and foam structure property data are set forth in Table 2.

The present foam structure blown with HFC-152a/isobutane had significantly better processing and physical properties than the control structure blown with only HFC-152a. The control structure had an undesirably small cell size even though no nucleating agent was used. The control structure had an undesirably small cross-sectional size, relatively high open cell content (greater than 10 percent), and virtually no foaming window (zero). The present structure exhibited substantially better performance in most of these properties.

Example B and Control Example 3

Ethylene polymer foam structures of the present invention were prepared with a blowing agent of varying proportions of HFC-152a and isobutane. Control foam structures were prepared with blowing agents of either HFC-152a or isobutane alone. The HFC-152a/isobutane mixed blowing agent provided the present foam structures with better compressive recovery than one blown with isobutane alone.

The apparatus used was a 3.50 inch (8.9 cm) screw-type extruder having substantially the same configuration as the extruder of Example 1. The apparatus was equipped with a gap-adjustable slit die with 2.25 inch (5.72 cm) width at the end of the cooling zone.

The polymer used was a 75/25 blend by weight of a granular LDPE resin having 0.22 dg/min melt index and 0.919 g/cm$^3$ density and another granular LDPE resin having 8 dg/min melt index and 0.919 g/cm$^3$ density. The polyethylene blend was fed into the extruder together with 1 pph stearyl stearamide (in concentrate form), 0.13 pph Hydrocerol CF-5 brand nucleating agent (Boehringer Ingelheim K.G., Germany) and 0.03 pph Irganox 1010 brand antioxidant (Ciba-Geigy Corp.) at a uniform rate of 400 lbs/hr (182 kgs/hr). The temperatures maintained at the extruder zones were 100° C. at the feeding zone, 120° C. and 140° C. at the transition zones, 165° C. and 180° C. at the melting zones, 220° C. at the metering zone, and 200° C. at the mixing zone. The blowing agents were injected at rates such that total blowing agent content was 6.8 pph. Cooling zone temperatures were adjusted to maintain optimum foaming temperatures of about 112° C. for Tests 3.1 through 3.4 and 113° C. for Test 3.5. Physical property data is seen in Table 3.

Foam structures of 39–42 mm thickness and 203–213 mm width formed at a fixed die gap of 0.13 inch were recovered. Two specimens of about 254–280 mm length from each test were examined for dimensional stability by periodically measuring the dimensions of the foams. Compressive recovery tests were conducted upon foam structures aged at ambient temperature (72° F.) for specific periods of time. Foam structures were compressed to 80 percent of original thickness at 0.5 inches/minute rate, and allowed to recover. During recovery, thickness was monitored periodically.

Surprisingly, the present foam structures exhibited greater compressive recovery than the control structure blown with isobutane alone. The greater compressive recovery allows retention of foam structure dimensions after die cutting.

While embodiments of the foam structure and the process of the present invention have been shown with regard to specific details, it will be appreciated that depending upon the manufacturing process and the manufacturer's desires, the present invention may be modified by various changes while still being fairly within the scope of the novel teachings and principles herein set forth.

TABLE 1

| | | | Processing and Physical Properties of the Foam Structure of Example 1 and Control Examples 1 | | | | | |
|---|---|---|---|---|---|---|---|---|
| Test No. | Blowing Agent Type | Blowing Agent Ratio[1] (molar) | Foam Cross-Sectional Area[2] (cm$^2$) | Foam Density[3] (kgm) | Cell Size[4] (mm) | Minimum Open Cell[5] (percent) | Foaming Window[6] (°C.) | Skin Quality[7] |

TABLE 1-continued

| | | | | | | | | |
|---|---|---|---|---|---|---|---|---|
| 1.1 | 152a/iC₄ | 50/50 | 1.2 | 38 | 1.6 | 0 | 13 | G |
| 1.2* | 152a | 100 | 0.8 | 42 | 0.6 | 9 | 1 | A |
| 1.3* | iC₄ | 100 | 1.3 | 39 | 2.0 | 0 | 12 | G |

*Not an example of this invention
[1] Mixture ratio of blowing agent by mole (molar)
[2] Cross-sectional area of foam body in square centimeters (cm$^2$)
[3] Density of aged foam body in kilograms per cubic meters (kgm)
[4] Cell size in millimeters (mm) determined per ASTM D3576
[5] Minimum open cell content of the foam made during the temperature scan in percentage (%) determined per ASTM 2856-A
[6] Window of foaming temperatures in degrees Celsius (°C.) providing an open cell content no greater than 10 percent
[7] Quality of foam body: G = good foam; A = acceptable

TABLE 2

Processing and Physical Properties of the Foam Structure of Example 2 and Control Example 2

| Test No. | Blowing Agent Type | Blowing Agent Ratio$^a$ (molar) | Foam Cross-Sectional Area$^2$ (cm$^2$) | Foam Density$^3$ (kgm) | Cell Size$^4$ (mm) | Minimum Open Cell$^5$ (percent) | Foaming Window$^6$ (°C.) | Skin Quality$^7$ |
|---|---|---|---|---|---|---|---|---|
| 2.1 | 152a/iC₄ | 75/25 | 1.3 | 36 | 1.1 | 3 | 6 | G |
| 2.2* | 152a | 100 | 0.5 | 37 | 0.3 | 12 | 0 | G |

*Not an example of this invention
[1] Mixture ratio of blowing agent by mole (molar)
[2] Cross-sectional area of foam body in square centimeters (cm$^2$)
[3] Density of aged foam body in kilograms per cubic meters (kgm)
[4] Cell size in millimeters (mm) determined per ASTM D3576
[5] Minimum open cell content of the foam made during the temperature scan in percentage (%) determined per ASTM 2856-A
[6] Window of foaming temperatures in degrees Celsius (°C.) providing an open cell content no greater than 10 percent
[7] Quality of foam body: G = good foam

TABLE 3

Processing and Physical Properties of the Foam Structures of Example 3 and Control Examples 3

| Test No. | iC₄/152a Ratio$^1$ (molar) | Foam Density$^2$ (kgm) | Cell Size$^3$ (mm) | Dimensional Stability$^4$ (percent) | Recovery after Compression 1 week$^5$ (percent) | Recovery after Compression 2 week$^6$ (percent) |
|---|---|---|---|---|---|---|
| 3.1* | 100/0 | 40 | 1.7 | 100 | 86 | 89 |
| 3.2 | 75/25 | 40 | 1.8 | 99 | 90 | 91 |
| 3.3 | 50/50 | 40 | 1.5 | 100 | 93 | 94 |
| 3.4 | 25/75 | 41 | 1.4 | 100 | 95 | 96 |
| 3.5* | 0/100 | 43 | 1.5 | 100 | 96 | 97 |

*Not an example of this invention
[1] Molar ratio of isobutane and HFC-152a blowing agents
[2] Density of aged foam body in kilograms per cubic meters (kgm)
[3] Cell size in millimeters (mm) determined per ASTM D3576
[4] Minimum volume of the foam body as a percentage (%) of the initial volume measured one hour after extrusion during aging at 72° F.
[5] Thickness of foam body as a percentage (%) of the original thickness one week after a one week-old foam was compressed to 80 percent of its thickness
[6] Thickness of foam body as a percentage (%) of the original thickness one week after a two week-old foam was compressed to 80 percent of its thickness

What is claimed is:

1. A process for making an ethylenic polymer foam structure, comprising:
    a) heating an ethylene polymer material comprising greater than 50 percent by weight ethylene monomeric units to form a melt polymer material;
    b) incorporating a stability control agent into the melt Dolymer material;
    c) incorporating into the melt polymer material at an elevated pressure a blowing agent comprising isobutane and 1,1-difluoroethane; and
    d) expanding the foamable gel at a lower pressure to form a foam structure.

2. The process of claim 1 wherein the blowing agent comprises about 5 to about 95 weight percent isobutane and about 95 to about 5 weight percent 1,1-difluoroethane, the blowing agent weight percentages being based upon the total weight of the blowing agent.

3. The process of claim 1, wherein the blowing agent comprises about 25 to about 75 weight percent isobutane and about 75 to about 25 weight percent 1,1-difluoroethane, the blowing agent weight percentages being based upon the total weight of the blowing agent.

4. The process of claim 1, wherein the foam structure is about 20 percent or less open-cell.

5. The process of claim 1, wherein the foam structure is about 10 percent or less open-cell.

6. The process of claim 1 wherein the foam structure has an average cell size of about 0.1 to about 5.0 millimeters.

7. The process of claim 1, wherein the foam structure has a density of about 200 kilograms per cubic meter or less.

8. The process of claim 1 wherein the ethylene polymer material comprises greater than 70 percent by weight of ethylene monomeric units.

9. The process of claim 1, wherein the foamable gel is expanded by extruding it through a die into a region of lower pressure to form the foam structure.

10. The process of claim 1, wherein the blowing agent consists essentially of isobutane and 1,1-difluoroethane.

11. The process of claim 1, wherein the blowing agent consists of isobutane and 1,1-difluoroethane.

12. The process of claim 1, wherein the blowing agent further comprises a co-blowing agent other than isobutane and 1,1-difluoroethane.

* * * * *